United States Patent
Brown

(10) Patent No.: US 8,786,157 B2
(45) Date of Patent: Jul. 22, 2014

(54) SEPARABLE TOOTH TIP ARMATURE CONSTRUCTION

(75) Inventor: Gerald W. Brown, Radford, VA (US)

(73) Assignee: Kollmorgen Corporation, Radford, VA (US)

( * ) Notice: Subject to any disclaimer, the term of this patent is extended or adjusted under 35 U.S.C. 154(b) by 230 days.

(21) Appl. No.: 13/157,516

(22) Filed: Jun. 10, 2011

(65) Prior Publication Data

US 2011/0309711 A1 Dec. 22, 2011

Related U.S. Application Data

(60) Provisional application No. 61/355,791, filed on Jun. 17, 2010, provisional application No. 61/355,896, filed on Jun. 17, 2010.

(51) Int. Cl.
*H02K 1/06* (2006.01)

(52) U.S. Cl.
USPC .............................. 310/216.024; 310/216.103

(58) Field of Classification Search
USPC .................... 310/216.023, 216.024, 216.102, 310/216.103, 216.104, 216.106
See application file for complete search history.

(56) References Cited

U.S. PATENT DOCUMENTS

| | | | |
|---|---|---|---|
| 3,869,629 A * | 3/1975 | Ogawa et al. | 310/216.069 |
| 5,008,572 A | 4/1991 | Marshall et al. | |
| 5,498,917 A | 3/1996 | Ninomiya et al. | |
| 5,642,013 A | 6/1997 | Wavre | |
| 5,910,691 A | 6/1999 | Wavre | |
| 6,858,965 B2 * | 2/2005 | Muller et al. | 310/216.008 |
| 7,560,844 B2 * | 7/2009 | Miyashita et al. | 310/216.092 |
| 8,410,656 B2 * | 4/2013 | Lokhandwalla et al. | 310/216.101 |
| 2004/0016105 A1 | 1/2004 | Johnson et al. | |
| 2004/0075359 A1 | 4/2004 | Muller et al. | |
| 2007/0290567 A1 | 12/2007 | Adaniya et al. | |

OTHER PUBLICATIONS

International Search Report dated Oct. 14, 2011 (Four (4) pages).
PCT/ISA/237 Form (Four (4) pages), Oct. 14, 2011.

* cited by examiner

*Primary Examiner* — Hanh Nguyen
(74) *Attorney, Agent, or Firm* — Crowell & Moring LLP

(57) ABSTRACT

In a process of producing a stator forming part of a rotary motor arrangement, a multiplicity of laminations are joined together to produce a first stack of laminations defining teeth, slots between adjacent teeth, and a yoke section connecting the teeth together. Coil elements are then mounted on the teeth so that the coil elements are disposed in the slots between the adjacent teeth, and a second stack of laminations is fitted onto an inner diameter of the first stack of laminations and fixed in place to function as tooth tips. At least part of the second lamination stack is then bored out or otherwise removed to dispose of all but a thin layer of the second stack of laminations bridging adjacent teeth defined by the first stack of laminations. A rotary motor stator produced by such a process is also described.

12 Claims, 5 Drawing Sheets

SEPARABLE TOOTH TIP ARMATURE CONSTRUCTION

CROSS-REFERENCE TO RELATED APPLICATIONS

This application claims priority under 35 U.S.C. §119(e) to U.S. provisional application Ser. No. 61/355,791, filed Jun. 17, 2010, the entire disclosure of which is incorporated by this reference into the present U.S. patent application.

Cross-reference is hereby made to commonly-owned provisional application Ser. No. 61/355,896, titled Asymmetrical Single Tooth Coil Design, filed Jun. 17, 2010, as well as to U.S. patent application Ser. No. 13/156,842, filed Jun. 9, 2011, now abandoned, based on that provisional application.

BACKGROUND OF THE INVENTION

1. Field of the Invention

The present invention relates to brushless motor armature arrangements, and, in particular, to wound stator constructions produced in manners maximizing efficiency and torque production benefits.

2. Description of Related Art

U.S. Pat. No. 5,642,013 and U.S. Pat. No. 5,910,691, both to Wavre, disclose synchronous motors including armatures having pluralities of solid teeth consolidated with yokes and spaced apart by slots in which coils are accommodated. The Wavre ('013) patent illustrates both linear and rotary motor arrangements, while the Wavre ('691) patent illustrates multiple linear motor arrangements. The disclosures of both the Wavre ('013) patent and the Wavre ('691) patent are expressly incorporated by reference herein in their entireties.

SUMMARY OF THE INVENTION

A stator constructed in accordance with the present invention is intended to create a higher efficiency brushless motor through the use of higher density wire coils (which may be crushed coils) in slots defined between stator teeth, while at the same time maintaining torque production benefits of the tooth tips and keeping the stator robust. In each configuration according to the invention, construction of a wound stator of the brushless motor begins initially by stamping stator laminations without tooth tips and then stacking these laminations together by bonding, dimpling, or in some other standard method to produce a first stack of laminations. Coils of magnet wire that have been tightly wound in layers and formed to give a high copper density are assembled on the teeth, and a second stack of laminations is then shrink or expansion fit onto the inner diameter of the first stack of laminations to function as tooth tips.

In one alternative according to the invention, the laminations in the second stack all have the same shape. The assembly, including the first and second lamination stacks, is bored out, but a thin bridge of material is left connecting all of the tooth tips.

In another alternative, the second stack will include laminations having two different shapes. One of these shapes is configured so that a bridge between stator teeth is thin, while the second shape is configured so that a bridge between stator teeth is relatively thick. The assembly, including the first and second stacks, is bored out such that, with all of the laminations having thin bridges, the bridges are machined away, but with all of the laminations having the thicker bridge, a thin portion of the bridge is maintained after boring is complete. In this way, with the second alternative, only some of the teeth of the stator are bridged, which minimizes losses while maintaining mechanical strength.

Another aspect of the present invention concerns a process of producing a stator for use in a rotary motor arrangement in which a multiplicity of laminations are joined together to produce a first stack of laminations defining teeth, slots between adjacent teeth, and a yoke section connecting the teeth together. Coil elements are then mounted on the teeth so that the coil elements have portions disposed in the slots between the adjacent teeth, and a second stack of laminations is fitted onto an inner diameter of the first stack of laminations and fixed in place to function as tooth tips. At least part of the second lamination stack is then bored out or otherwise removed to dispose of all but a thin layer of the second stack of laminations bridging adjacent teeth so as to form the stator.

In the particular embodiments described, the portion removed from the second lamination stack is either annular or crescent-shaped. The laminations in the second lamination stack could all have the same shape, or could be shaped differently.

The present invention also concerns stators for a rotary motor produced by processes such as those mentioned. In one embodiment of the invention, a thin layer of material connects all tips of the stator teeth together, while in another embodiment, a fraction of the stator laminations includes thin material layers that connect only some, and not all, tips of the stator teeth together.

DETAILED DESCRIPTION OF THE INVENTION

Figure 1:
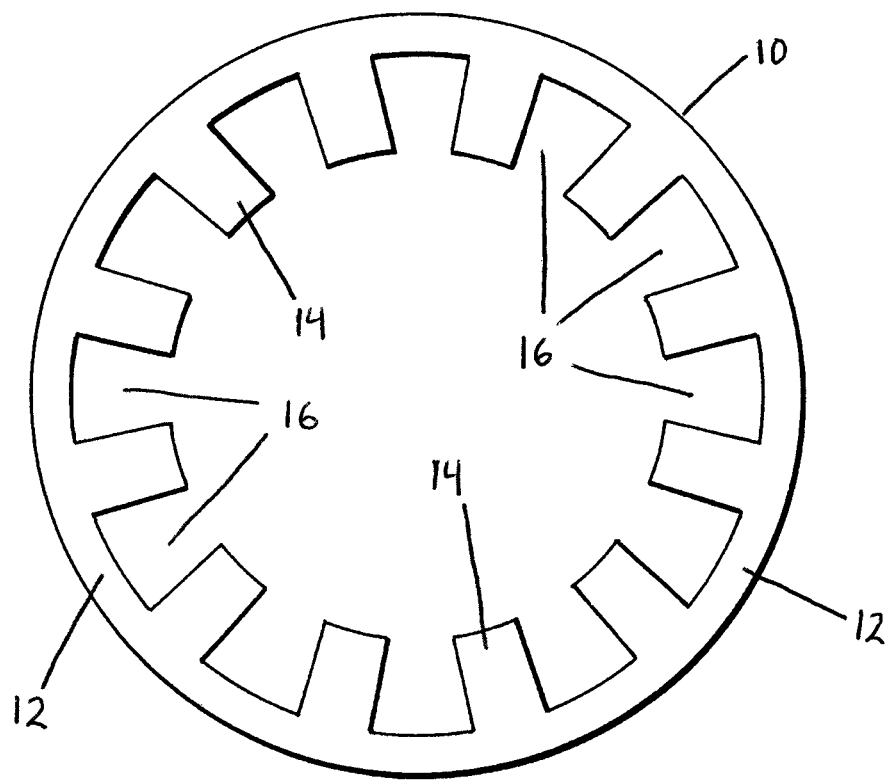
FIG. 1 is a plan view of one of a multiplicity of laminations used to construct a stator in accordance with the present invention.
Figure 2:
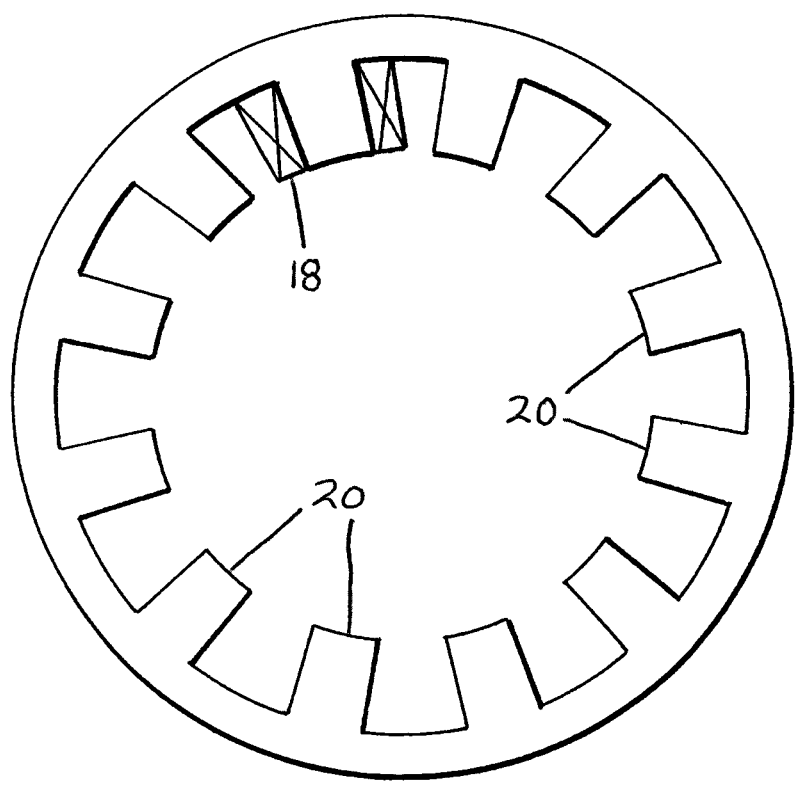
FIG. 2 is a schematic illustration of assembly of wire coils to a tooth formed by a first stack of laminations that ultimately forms part of the stator.

The lamination 10 shown in plan view in FIG. 1 is one of a multiplicity of such laminations used to construct a stator in accordance with the present invention. Each lamination as illustrated includes a roughly circular yoke section 12 and tooth sections 14 protruding radially inwardly from the yoke section. It will be understood by those of ordinary skill in the art that the multiplicity of laminations 10 are joined together by bonding, dimpling, or another standard method to produce a first stack of the laminations 10, which ultimately will define part of the finished stator. The finished stator is to be used as part of a rotary motor arrangement similar to that disclosed by the Wavre ('013) patent. As illustrated, openings or recesses 16 defined between the tooth sections 14 are wedge shaped, since the opening widths decrease at locations closer to the center of the yoke section 12.

Assembly of wire coils to each tooth 20 produced from stacked tooth sections 14 is schematically illustrated in FIG.

2. The relatively large slot opening between adjacent teeth facilitates this wire coil assembly. Each wire coil element 18 is formed from numerous turns (for example, 50 or more turns) of insulated copper wire, which may be compressed to define a "crushed coil" wire coil element. A coil element 18 is mounted to one of the teeth 20 by passing the open center of the coil element 18 over and past the radially inner end of a tooth 20, until coils of magnet wire that have been tightly layer wound and formed to give a high copper density have been assembled on as many of the teeth 20 as is desired, with lateral sections of the coil elements 18 disposed in slots defined between adjacent teeth 20.

Figure 3:
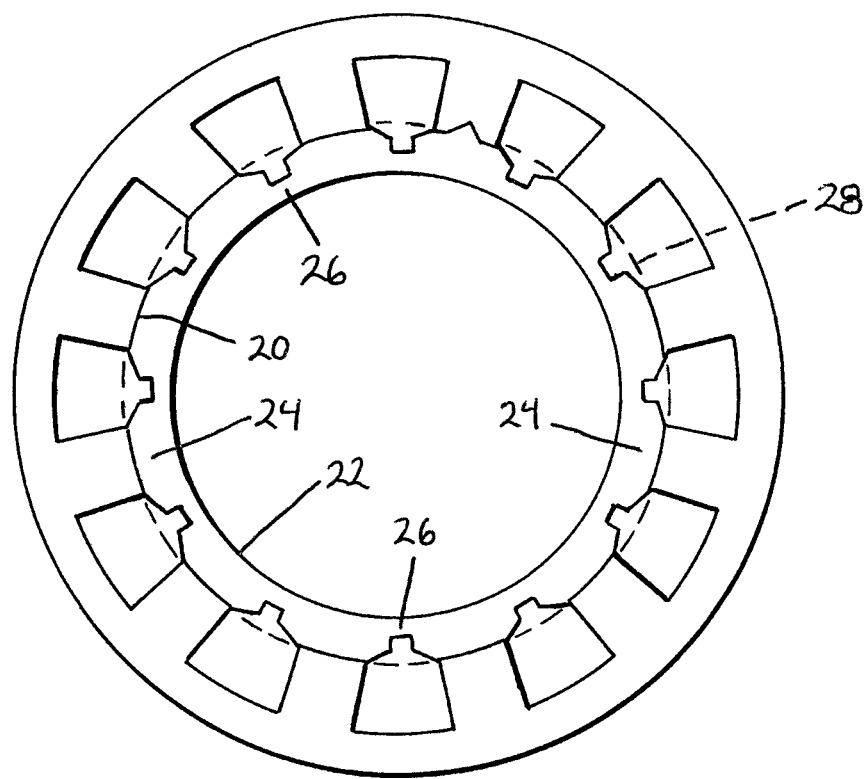
FIG. 3 is a schematic illustration of the unfinished stator after a second stack of laminations, ultimately forming stator tooth tips, has been secured by shrink or expansion fitting to the inner diameter of the first stack of laminations.
Figure 4:
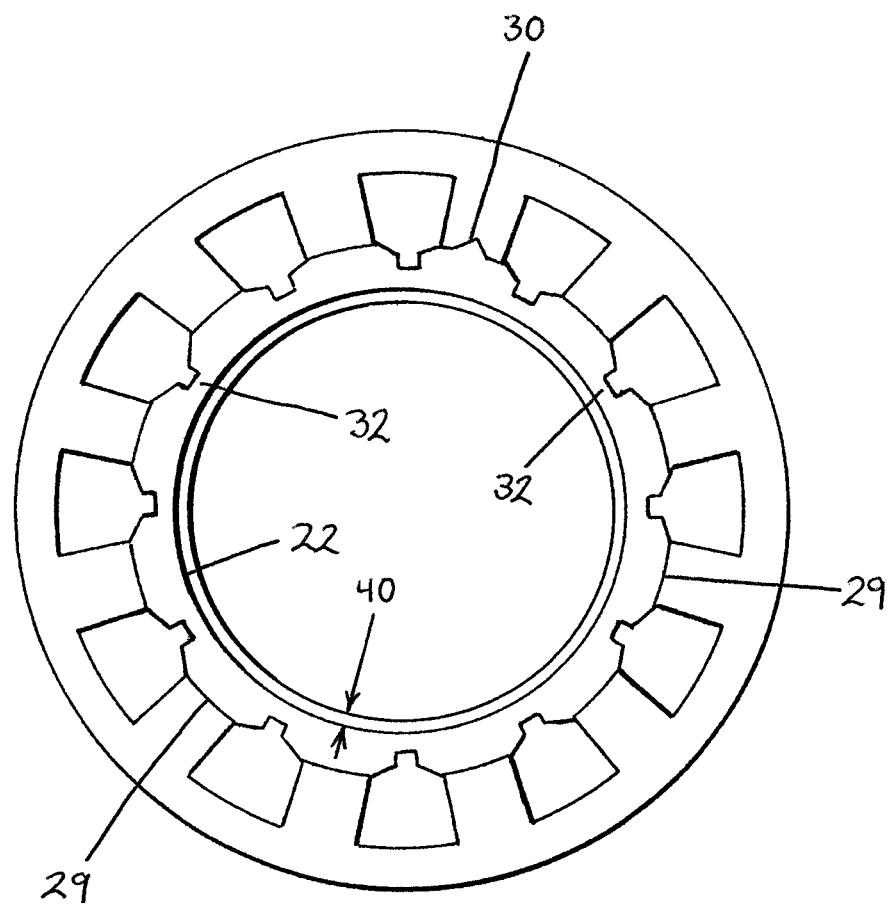
FIG. 4 is a schematic end view of a finished stator according to one embodiment of the invention with the wire coils mounted thereto omitted.
Figure 5:
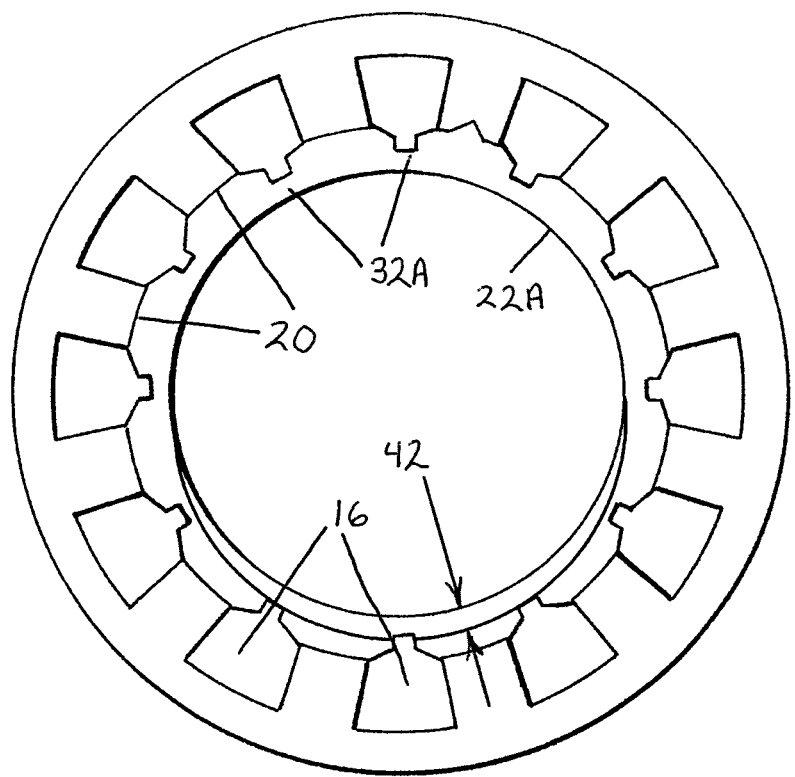
FIG. 5 is a schematic end view of a finished stator according to an alternative embodiment of the invention with the wire coils mounted thereto omitted.

A second stack of laminations, identified overall by reference number 22, is then secured by shrinking the first lamination stack (or, alternatively, expanding the second lamination stack) so that the outer circumferential surface of the second stack of laminations is pressed onto the inner diameter of the first stack of laminations as shown in FIG. 3 to function as tooth tips. The shrinking or expanding operation may be performed by appropriately heating and then cooling the first lamination stack, cooling and then heating the second lamination stack, or combining these steps appropriately. Other methods of securing the lamination stacks together, such as gluing, welding, and so on, could be used in addition to or in place of the heat shrinking or heat expanding operations mentioned. The inner diameter of the first lamination stack, of course, is typically defined by radially inner ends of the teeth 20. The tooth tip lamination stack 22 includes tooth tips 24 and a ring 26, from which the tooth tips 24 extend radially outwardly, joining the tips 24 together. The first lamination stack and the second, tooth tip lamination stack 22, upon being joined together, will be connected at facing surfaces located along an imaginary cylinder 28 aligned with interfaces between the stacks. Such interfaces 29 are best shown in FIGS. 4 and 5. A locating, anti-rotation, or locating and anti-rotation protrusion 30 may be defined on an outer radial end of a tooth 20 or an inner radial end of a tooth tip 24 for reception in a corresponding protrusion-receiving recess in an associated tooth tip 24 or tooth 20, respectively, to aid in positioning and preventing relative rotation of the first and second lamination stacks as they are joined together. A plurality of such protrusions could be used if desired. For a stator arrangement such as that shown in FIG. 3, which includes twelve teeth, it is advantageous to include one protrusion 30 on each tooth, so that twelve of the protrusions 30 will be present.

In one embodiment of the invention, represented by way of example in FIG. 4, the laminations in the second stack 22 all have the same shape. After the first and second lamination stacks are joined together, the overall stator assembly, including the first and second lamination stacks, is then ground out, bored out, or otherwise processed to remove an annulus 40 of material from the radially inner portion of the second lamination stack. Although all of the material between adjacent teeth could be removed by boring, a thin bridge 32 of material is advantageously left between adjacent teeth. A plurality of these bridges 32 preferably connects all of the tooth tips 24 together. These bridges 32 of material help to maintain structural integrity of the stator.

In another embodiment of the invention, the second stack of laminations includes laminations of two different types having two different shapes. One of these shapes is configured so that a bridge between stator teeth is thin, while the second shape is configured so that a bridge between stator teeth is relatively thick. The assembly including the first and second stacks is then bored out such that, with all of the laminations having thin bridges, the bridges are machined away, but with all of the laminations having the thicker bridge, a thin portion of the bridge is maintained after boring is complete. In this way, with this alternative, only some of the teeth of the stator are bridged, which minimizes losses while maintaining mechanical strength.

Rather than providing all laminations with the shape shown in FIG. 4, in a further embodiment of the invention, it is possible to provide at least some of the laminations in the overall lamination stack with the shape shown in FIG. 5. To produce laminations having the shape illustrated in FIG. 5, a partial stack 22A of laminations, or any number of individual laminations, prior to being joined together with other laminations to form the overall stack, may be bored out along an axis that is not coincident with a central axis of the partial stack or the lamination. FIG. 5 illustrates a crescent-shaped partial annulus 42 of material, rather than a complete ring of material, as being removed from the radially inner portion of the partial stack 22A. Some, but not all, of the openings 16 defined between teeth 20 of the partial stack 22A will thus be open to the radially interior volume of the stator assembly to face the rotor (not shown), while others will have thin bridges 32A of material closing off the openings 16. To leave adequate structural support for the other tooth tips, and to reduce the amount of tooth-to-tooth leakage, it is contemplated that a certain percentage, such as approximately one out of every eight laminations in the overall lamination stack constituting a stator, will be provided with the configuration shown in FIG. 5, leaving bridges of material between some of the teeth. This percentage may vary significantly, although, preferably, fewer laminations will have bridges than will lack bridges. The ratio selected is easily achieved by distributing an appropriate number of laminations configured as shown in FIG. 5 within a lamination stack having laminations primarily configured as shown in FIG. 4.

Each tightly compacted single tooth coil 18 is preferably implemented to minimize the axial length of the end turn. Also, reducing the amount of copper in the end turns will help maintain high generator efficiency. Novel coil insertion techniques allow one to achieve high copper fill percentages in the slot, resulting in high generator efficiencies.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process of producing a part of a rotary motor arrangement comprising:
   joining a multiplicity of laminations together to produce a first stack of laminations defining teeth, slots between adjacent teeth, and a yoke section connecting the teeth together,
   mounting coil elements on said teeth so that portions of the coil elements are disposed in at least some of said slots between adjacent teeth,
   fitting a second stack of laminations onto an inner diameter of the first stack of laminations and fixing the second stack in place to function as tooth tips, and
   removing at least a portion of the second lamination stack after fixing the second stack in place on the inner diameter of the first lamination stack so as to leave only a thin layer of the second stack of laminations bridging adjacent teeth defined by said first stack of laminations and form said part of the rotary motor arrangement.

2. The process according to claim 1, wherein the thin layer connects all tips of said teeth together.

3. The process according to claim 1, wherein the thin layer connects only some, and not all, tips of said teeth together.

4. The process according to claim 1, wherein said part is a stator of said rotary motor arrangement.

5. A stator produced by the process of claim 4.

6. The process according to claim 1, wherein said portion removed from the second lamination stack is removed by boring.

7. The process according to claim 1, wherein said portion removed from the second lamination stack is annular.

8. The process according to claim 1, wherein said portion removed from the second lamination stack is crescent-shaped.

9. The process according to claim 1, wherein said second lamination stack includes laminations having different shapes.

10. The process according to claim 1, wherein all laminations in said second lamination stack have the same shape.

11. A stator that is to form part of a rotary motor arrangement comprising:

a multiplicity of laminations joined together to produce a first stack of laminations defining teeth, slots between adjacent teeth, and a yoke section connecting the teeth together, coil elements mounted on said teeth so that portions of the coil elements are disposed in at least some of said slots between adjacent teeth, and a second stack of laminations fitted onto an inner diameter of the first stack of laminations and fixed in place relative to the first stack to function as tooth tips, wherein at least a portion of the second lamination stack has been removed after fixing the second stack in place on the inner diameter of the first lamination stack to leave only a thin layer of the second stack of laminations bridging adjacent teeth defined by said first stack of laminations and form said part of the rotary motor arrangement, and wherein the thin layer of material connects only some, and not all, tips of said teeth together.

12. The stator according to claim 11, wherein said second lamination stack includes laminations having different shapes.

* * * * *